United States Patent
Nishida et al.

(10) Patent No.: US 9,408,131 B2
(45) Date of Patent: Aug. 2, 2016

(54) MOBILE COMMUNICATION METHOD AND MOBILE COMMUNICATION SYSTEM

(75) Inventors: Katsutoshi Nishida, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 514 days.

(21) Appl. No.: 13/701,761

(22) PCT Filed: Mar. 17, 2011

(86) PCT No.: PCT/JP2011/056329
§ 371 (c)(1),
(2), (4) Date: Dec. 3, 2012

(87) PCT Pub. No.: WO2011/152102
PCT Pub. Date: Dec. 8, 2011

(65) Prior Publication Data
US 2013/0070655 A1    Mar. 21, 2013

(30) Foreign Application Priority Data

Jun. 4, 2010    (JP) ................................. 2010-129116

(51) Int. Cl.
| | |
|---|---|
| H04B 7/00 | (2006.01) |
| H04W 4/00 | (2009.01) |
| H04L 12/26 | (2006.01) |
| H04W 40/02 | (2009.01) |
| H04W 72/04 | (2009.01) |
| H04M 7/12 | (2006.01) |
| H04W 36/00 | (2009.01) |
| H04W 88/16 | (2009.01) |
| H04L 29/06 | (2006.01) |

(52) U.S. Cl.
CPC ............. *H04W 40/02* (2013.01); *H04L 65/104* (2013.01); *H04L 65/1086* (2013.01); *H04M 7/1205* (2013.01); *H04W 36/0022* (2013.01); *H04W 36/0066* (2013.01); *H04W 72/0406* (2013.01); *H04L 65/1016* (2013.01); *H04M 2207/187* (2013.01); *H04W 88/16* (2013.01)

(58) Field of Classification Search
USPC .................................................. 370/310, 331
See application file for complete search history.

(56) References Cited

U.S. PATENT DOCUMENTS

| 7,280,516 B1 | 10/2007 | Costa et al. | |
|---|---|---|---|
| 2011/0032923 A1 | 2/2011 | Ho | |
| 2011/0200011 A1* | 8/2011 | Rune ............................ | 370/331 |

(Continued)

FOREIGN PATENT DOCUMENTS

| CN | 101227677 A | 7/2008 |
|---|---|---|
| JP | 2003-507978 A | 2/2003 |
| JP | 2011-512703 A | 4/2011 |

(Continued)

OTHER PUBLICATIONS

3GPP TR 23.856 V0.4.1, Mar. 10, 2010, p. 16, 17 and 37-39.

(Continued)

*Primary Examiner* — Kiet Tang
(74) *Attorney, Agent, or Firm* — Sughrue Mion, PLLC (57) ABSTRACT

A mobile communication method according to the present invention includes the steps of: sending "INVITE" from a UE#1 to a P-CSCF/VATF in a visited network of the UE#1; sending "INVITE" from the P-CSCF/VATF to an IMS; and allocating, by the P-CSCF/VATF, an MGW#1 to the path for voice communications.

8 Claims, 7 Drawing Sheets

(56) References Cited

U.S. PATENT DOCUMENTS

| | | | |
|---|---|---|---|
| 2012/0044825 A1* | 2/2012 | Zisimopoulos | H04W 36/385 370/252 |
| 2013/0142168 A1* | 6/2013 | Vedrine et al. | 370/331 |

FOREIGN PATENT DOCUMENTS

| | | |
|---|---|---|
| RU | 2366107 C2 | 8/2009 |
| WO | 2004112415 A2 | 12/2004 |
| WO | 2006120289 A2 | 11/2006 |
| WO | 2009/024082 A1 | 2/2009 |
| WO | 2009/028928 A1 | 3/2009 |
| WO | 2009/089085 A1 | 7/2009 |
| WO | 2009089987 A1 | 7/2009 |
| WO | 2010/052343 A2 | 5/2010 |

OTHER PUBLICATIONS

3GPP TS 23.216 V9.3.0, Mar. 2010, pp. 1-41.
Japanese Office Action for corresponding JP 2010-129116 dated Apr. 5, 2011.
3GPP TR 23.856 V1.0.0, "3$^{rd}$ Generation Partnership Project; Technical Specification Group Services and System Aspects; Single Radio Voice Call Continuity (SRVCC) enhancements; Stage 2 (Release 10)" Mar. 2010, pp. 1-52.
Office Action dated Jan. 14, 2014, issued by the Japanese Patent Office in counterpart Japanese Application No. 2011-207363.
3rd Generation Partnership Project; Technical Specification Group Services and System Aspects; Single Radio Voice Call Continuity (SRVCC); Stage 2 (Release 8), Jun. 2009, 3GPP TS 23.216 V8.4.0, 36 pages.
Communication dated Aug. 17, 2015, issued by the State Intellectual Property Office of the People's Republic of China in corresponding Chinese Application No. 201180027407.8.
Huawei, "Dynamic bicast in CS MGW," 3GPP TSG WG2 Meeting #77 Jan. 18-22, 2010, Shenzhen, China, TD S2-100278, pp. 1-6.
Communication dated Nov. 25, 2015, from the European Patent Office in counterpart application No. 15178925.2.
Communication dated Jul. 13, 2015, issued by the Russian Patent Office in corresponding Russian Application No. 2014131250/07.
Communication dated Jan. 20, 2016 from the U.S. Patent and Trademark Office in counterpart U.S. Appl. No. 14/812,147.

\* cited by examiner

MOBILE COMMUNICATION METHOD AND MOBILE COMMUNICATION SYSTEM

TECHNICAL FIELD

The present invention relates to a mobile communication method and a mobile communication system.

BACKGROUND ART

Heretofore, a mobile communication system has been known which can include a radio access network (UTRAN: Universal Terrestrial Radio Access Network, or GERAN: GSM EDGE Radio Access Network) of a 2G/3G system and a radio access network (EUTRAN: Evolved Universal Terrestrial Radio Access Network) of an LTE (Long Term Evolution) system.

3GPP TS 23.216 defines "SRVCC (Single Radio Voice Call Continuity) system" for switching a path for voice communications between a UE (User Equipment) #1 and a UE#2 from a path (path for VoIP (Voice over IP) communications) through E-UTRAN or UTRAN to a path (path for circuit switch (CS) communications) through UTRAN/GERAN.

In addition, Alt. 4, Alt. 11, and the like of 3GPP TR 23.856 v0.4.1 define an SRVCC system (hereinafter referred to as enhanced SRVCC system) for switching the path for voice communications between the UE#1 and the UE#2 from the path through E-UTRAN to the path through UTRAN/GERAN with an MGW (Media gateway) #1 in a visited network of the UE#1 used as an anchor point.

With the enhanced SRVCC system, a signal required for switching the path for voice communications between the UE#1 and the UE#2 can be terminated within the visited network of the UE#1. Thus, instantaneous communication-interruption time due to the exchange of the signals between the visited network of the UE#1 and the home network of the UE#1 can be shortened from that in the conventional SRVCC system.

A procedure for establishing a path for voice communications between the UE#1 and the UE#2 is described below with reference to FIG. 7.

Figure 7:
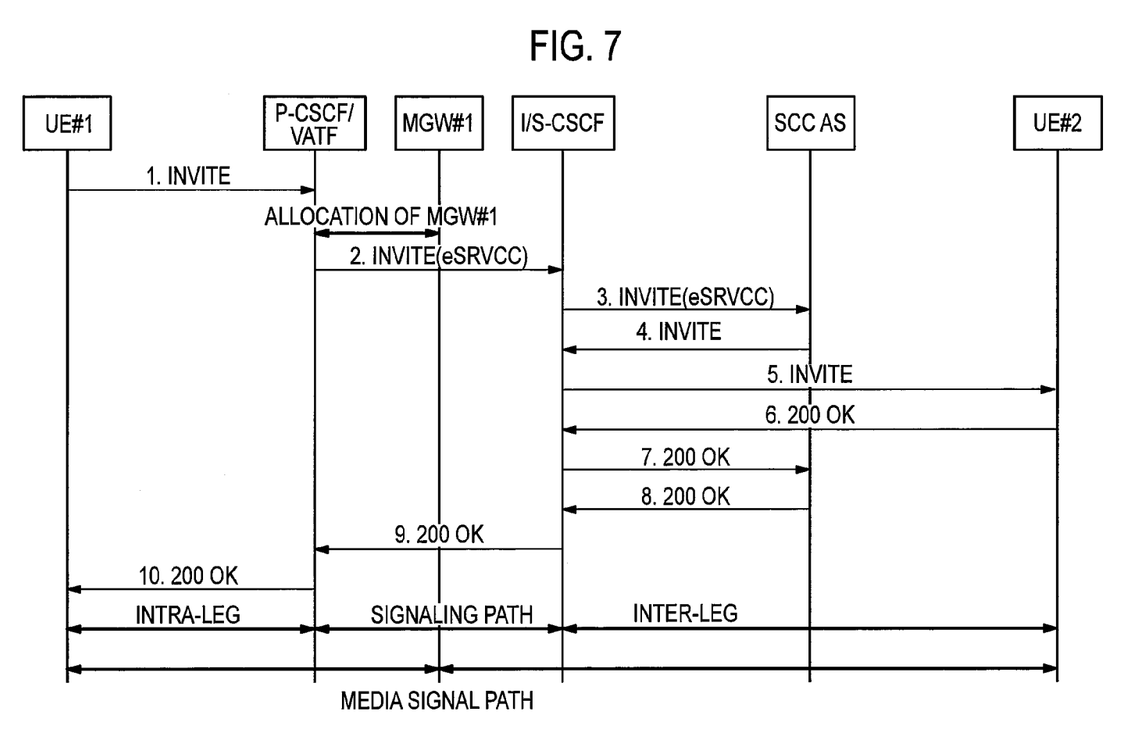
FIG. 7 is a sequence diagram for describing an operation of a conventional mobile communication system.

As shown in FIG. 7, the UE#1 sends "INVITE" to a P-CSCF (Proxy-Call Session Control Function)/VATF (Visited Access Transfer Function) in Step 1.

In Step 2, the P-CSCF/VATF allocates the MGW#1 to the path.

The P-CSCF/VATF sends "INVITE" to an I/S-CSCF (Interogation/Serving-Call Session Control Function), "INVITE" including identification information on MGW#1 and "eSRVCC" indicating that an enhanced SRVCC system can be used.

In Step 3, the I/S-CSCF sends "INVITE" including "eSRVCC" to SCC AS (Service Centralization and Continuity Application Server).

In Step 4, the SCC AS sends "INVITE" to the I/S-CSCF. In Step 5, the I/S-CSCF sends "INVITE" to the UE#2.

In Step 6, the UE#2 sends "200 OK (response signal to "INVITE")" to the I/S-CSCF. In Step 7, the I/S-CSCF sends "200 OK" to the SCC AS. In Step 8, the SCC AS sends "200 OK" to the I/S-CSCF. In Step 9, the I/S-CSCF sends "200 OK" to the P-CSCF/VATF. In Step 10, the P-CSCF/VATF sends "200 OK" to the UE#1.

As a result, a signaling path for voice communications between the UE#1 and the UE#2 is established among the UE#1, the P-CSCF/VATF, the I/S-CSCF, and the UE#2, and a media signal path for voice communications between the UE#1 and the UE#2 is established among the UE#1, the MGW#1, and the UE#2.

SUMMARY OF THE INVENTION

Problem to be Solved by the Invention

Figure 3:
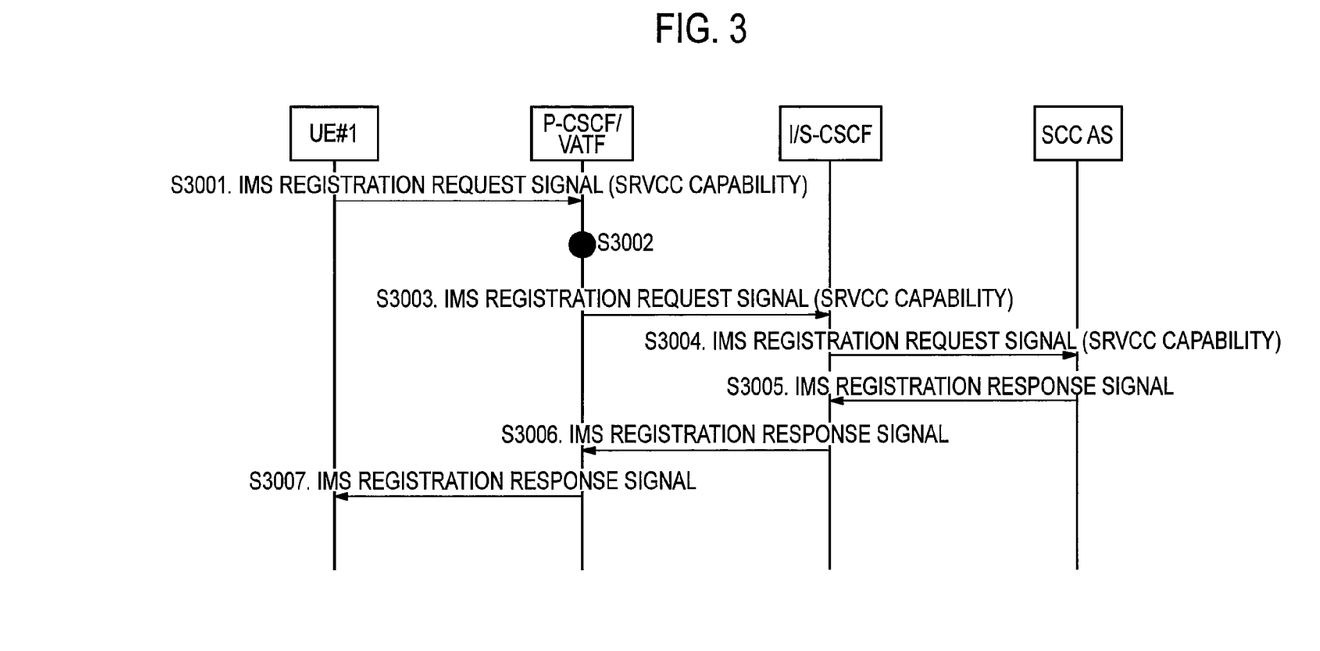
FIG. 3 is a sequence diagram for describing an operation of a mobile communication system according to a first modification of the present invention.

In the procedure shown in FIG. 3, however, the MGW#1 is allocated even in a case where the enhanced SRVCC system cannot be used, such as a case where the UE#1 does not support the SRVCC system. Thus, there has been a problem that a resource of the MGW#1 is wasted.

The present invention is made in view of the above problem, and an objective of the present invention is to provide a mobile communication method and a mobile communication system capable of preventing the resource of the MGW#1 from being wasted.

Means for Solving the Problem

A first feature of the present invention is a mobile communication method in a mobile communication system including a first radio access network that does not support circuit-switched communications and a second radio access network that supports the circuit-switched communications, and being capable of using a switching scheme for switching a path for voice communications between a first mobile station and a second mobile station in a predetermined node in a visited network of the first mobile station, from a path through the first radio access network to a path through the second radio access network, the mobile communication method including the steps of: sending a session start request signal including capability of the first mobile station from the first mobile station to a first session control node in the visited network; sending the session start request signal including the capability of the first mobile station from the first session control node to a service control network; determining, by the service control network, whether to send an allocation request signal for the predetermined node based on the capability of the first mobile station; and allocating, by the first session node, the predetermined node based on the allocation request signal received from the service control network.

A second feature of the present invention is a mobile communication method in a mobile communication system including a first radio access network that does not support circuit-switched communications and a second radio access network that supports the circuit-switched communications, and being capable of using a switching scheme for switching a path for voice communications between a first mobile station and a second mobile station in a predetermined node in a visited network of the first mobile station, from a path through the first radio access network to a path through the second radio access network, the mobile communication method including the steps of: notifying by the first mobile station, a first session control node of capability of the first mobile station in a registration procedure to service control network; sending a session start request signal from the first mobile station to the first session control node; and determining by the first session control node, whether to allocate the predetermined node based on the capability of the first mobile station.

A third feature of the present invention is a mobile communication method in a mobile communication system including a first radio access network that does not support circuit-switched communications and a second radio access network that supports the circuit-switched communications, and being capable of using a switching scheme for switching a path for voice communications between the first mobile station and a second mobile station in a predetermined node in a visited network of a first mobile station, from a path through the first radio access network to a path through the second radio access network, the mobile communication method including the steps of: notifying, by the first mobile station, a service control network of capability of the first mobile station in a registration procedure to the service control network; sending a session start request signal from the first mobile station to the first session control node; sending the session start request signal from the first session control node to the service control network; determining, by the service control network, whether to send an allocation request signal for the predetermined node based on the capability of the first mobile station; and allocating, by the first session node, the predetermined node based on the allocation request signal received from the service control network.

A fourth feature of the present invention is a mobile communication system including a first radio access network that does not support circuit-switched communications and a second radio access network that supports the circuit-switched communications, and being capable of using a switching scheme for switching a path for voice communications between the first mobile station and a second mobile station in a predetermined node in a visited network of a first mobile station, from a path through the first radio access network to a path through the second radio access network. A first session control node in the visited network is configured to send the session start request signal including the capability of the first mobile station to a service control network, when receiving a session start request signal including capability of the first mobile station from the first mobile station. The service control network is configured to determine whether to send an allocation request signal for the predetermined node based on the capability of the first mobile station. The first session control node is configured to allocate the predetermined node based on the allocation request node received from the service control network.

A fifth feature of the present invention is a mobile communication system including a first radio access network that does not support circuit-switched communications and a second radio access network that supports the circuit-switched communications, and being capable of using a switching scheme for switching a path for voice communications between the first mobile station and a second mobile station in a predetermined node in a visited network of a first mobile station from a path through the first radio access network to a path through the second radio access network. A first session control node in the visited network is configured to acquire and store capability of the first base station in a registration procedure of the first mobile station to a service control network. The first session control node is configured to determine whether to allocate the predetermined node based on the capability of the first mobile station, when receiving a session start request signal from the first mobile station.

A sixth feature of the present invention is a mobile communication system including a first radio access network that does not support circuit-switched communications and a second radio access network that supports the circuit-switched communications, and being capable of using a switching scheme for switching a path for voice communications between the first mobile station and a second mobile station in a predetermined node in a visited network of a first mobile station, from a path through the first radio access network to a path through the second radio access network. A service control network is configured to acquire and store capability of the first base station in a registration procedure of the first mobile station to the service control network. The service control network is configured to determine whether to send an allocation request signal for the predetermined node based on the capability of the first mobile station, when receiving a session start request signal sent by the first mobile station. The first session control node is configured to allocate the predetermined node based on the allocation request signal received from the service control network.

Effect of the Invention

As described above, the present invention can provide a mobile communication method and a mobile communication system capable of preventing a resource of an MGW#1 from being wasted.

MODE FOR CARRYING OUT THE INVENTION

Mobile Communication System According to First Embodiment of Present Invention

A mobile communication system according to a first embodiment of the present invention is described with reference to FIG. 1 and FIG. 2.

The mobile communication system according to this embodiment includes E-UTRAN and UTRAN/GERAN.

Figure 1:
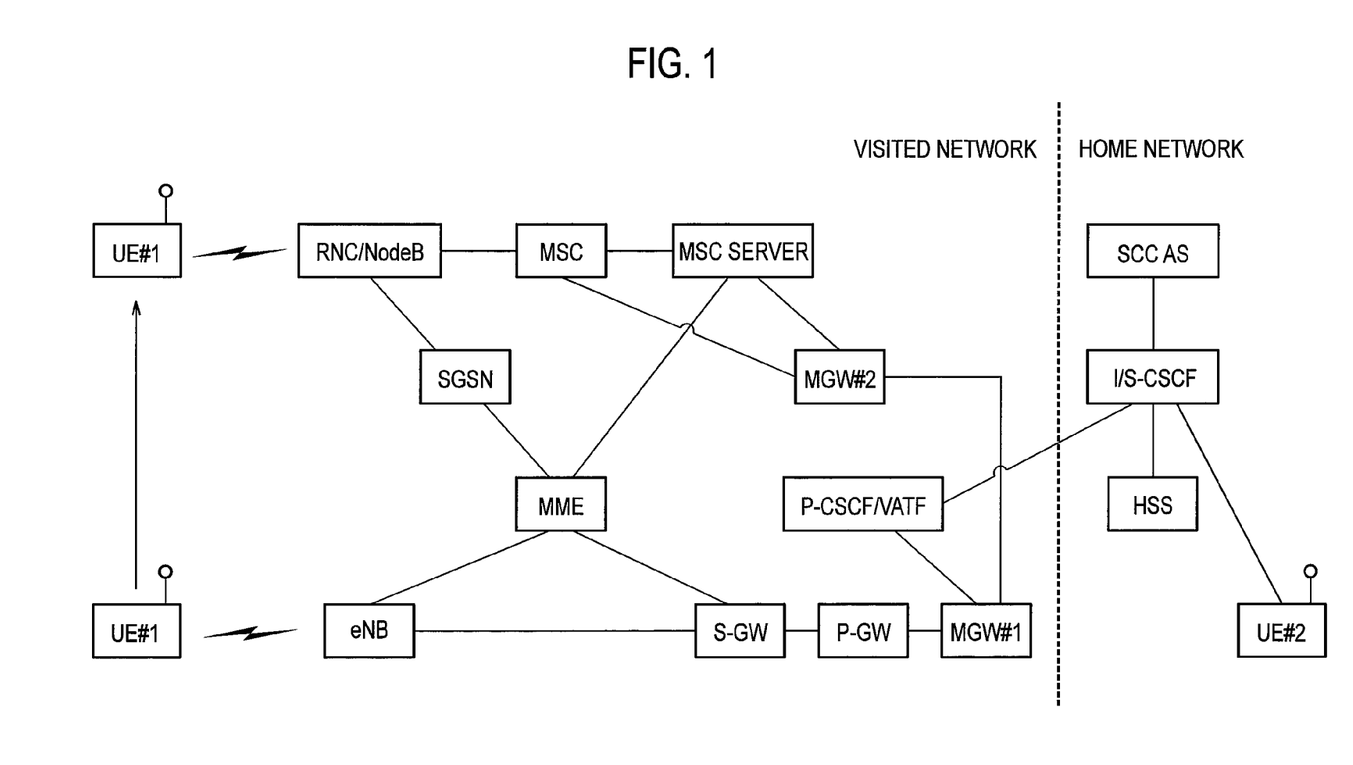
FIG. 1 is an overall configuration diagram of a mobile communication system according to a first embodiment of the present invention.

Specifically, as shown in FIG. 1, the mobile communication system according to this embodiment includes, in a visited network of a UE#1, an eNB (radio base station), an RNC (Radio Network Controller, radio network control station), a Node B (radio base station), a BSS (not shown), an MME (Mobility Management Entity, mobility management node), an S-GW (Serving-Gateway, serving gateway device), a P-GW (PDN-Gateway, PDN gateway device), a DHCP (Dynamic Host Configuration Protocol) server, a P-CSCF/VATF, an MGW#1, an MSC (Mobile-service Switching Center, circuit exchange), an SGSN (Serving GPRS Support Node, packet exchange), an MSC server, an MGW#2, and the like.

Here, the P-CSCF and the VATF may be provided in a single device, or may be provided in different devices. The VATF may be provided in devices such as the P-GW, the S-GW, or an IBCF (unillustrated Interconnection Border Control Function described in TS 23.228), for example.

The mobile communication system according to this embodiment includes an SCC AS, an I/S-CSCF, and the like in a home network of the UE#1.

In the mobile communication system of this embodiment, with an SRVCC system or an enhanced SRVCC system, the path for voice communications between the UE#1 and the UE#2 can be switched from a path (path for IMS VoIP communications) through E-UTRAN or UTRAN to a path (path for circuit-switched communications) through UTRAN/GE-RAN.

A procedure for establishing the path for voice communications between the UE#1 and the UE#2 is described below with reference to FIG. 2.

Figure 2:
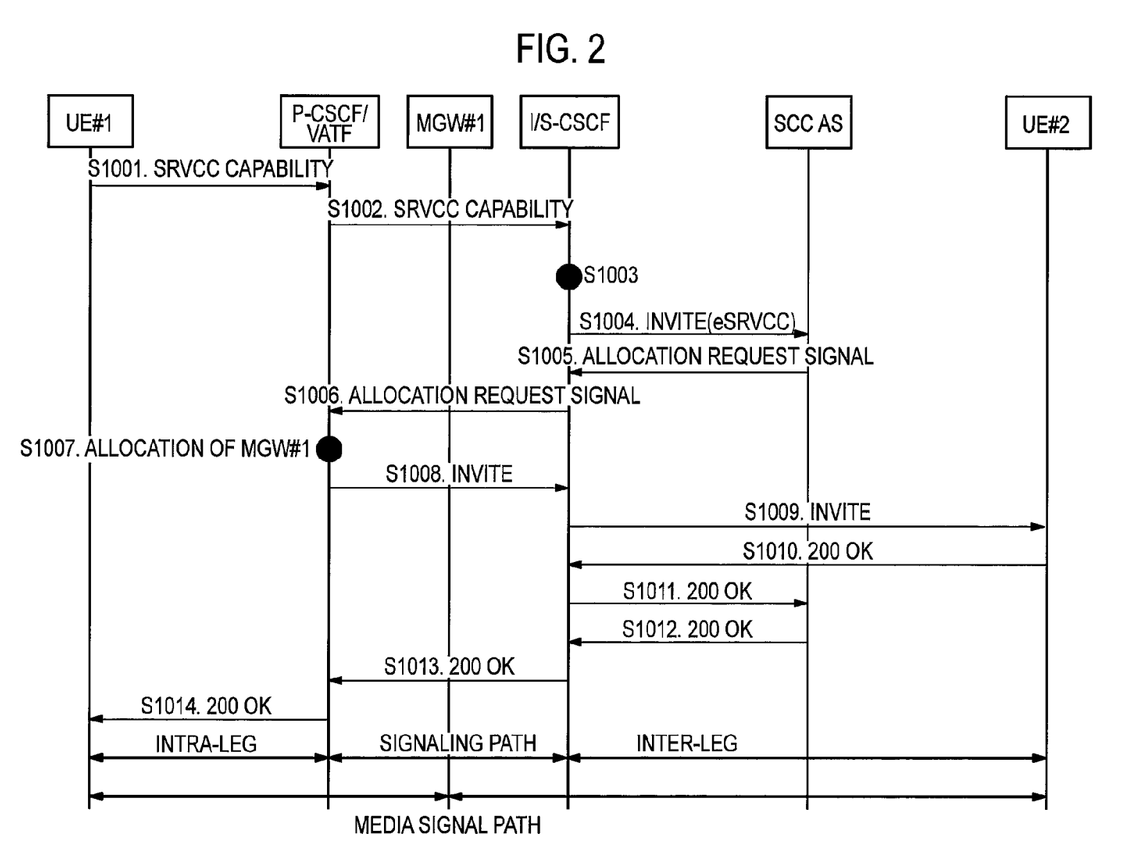
FIG. 2 is a sequence diagram for describing an operation of the mobile communication system according to the first embodiment of the present invention.

As shown in FIG. 2, in Step S1001, the UE#1 sends the P-CSCF/VATF "INVITE" including SRVCC capability indicating whether the UE#1 supports the SRVCC system.

In Step S1002, the P-CSCF/VATF sends the I/S-CSCF in an IMS (IP Multimedia Subsystem) "INVITE" including "eSRVCC" indicating that the enhanced SRVCC system can be used and the SRVCC capability.

In Step S1003, the I/S-CSCF determines whether to use the enhance SRVCC system. The determination is based on a subscriber profile of the UE#1 managed by an HSS (Home Subscriber Server), the SRVCC capability in the received "INVITE", a policy of the home network or visited network of the UE#1, and the like. In Step S1004, the I/S-CSCF sends the SCC AS in the IMS "INVITE" including "eSRVCC" indicating the determination result.

In Step S1005, the SCC AS sends the I/S-CSCF "INVITE" including an allocation request signal for MGW#1. The signal may not include the allocation request signal for the MGW#1.

In Step S1006, the I/S-CSCF sends "INVITE" including the allocation request to the P-CSCF/VATF.

The P-CSCF/VATF allocates the MGW#1 based on the allocation request signal in Step S1007, and sends "INVITE" to the I/S-CSCF in Step S1008.

The I/S-CSCF sends "INVITE" to the UE#2 in Step S1009 and the UE#2 sends "200 OK (response signal for "INVITE")" to the I/S-CSCF in Step S1010.

In Step S1011, the I/S-CSCF sends "200 OK" to the SCC AS. In Step S1012, the SCC AS sends "200 OK" to the I/S-CSCF. In Step S1013, the I/S-CSCF sends "200 OK" to the PCSCF/VATF. In Step S1014, the PCSCF/VATF sends "200 OK" to the UE#1.

As a result, a signaling path for voice communications between the UE#1 and the UE#2 is established among the UE#1, the P-CSCF/VATF, and the UE#2, and a media signal path for voice communications between the UE#1 and the UE#2 is established among the UE#1, the MGW#1, and the UE#2.

In the mobile communication system according to this embodiment, it is possible to not allocate the MGW#1 to a path where the enhanced SRVCC system cannot be used among the paths for voice communications between the UE#1 and the UE#2. Thus, the resource of the MGW#1 can be prevented from being wasted.

First Modification

A mobile communication system according to a first modification of the first embodiment described above is described below with reference to FIG. 3 and FIG. 4, while focusing on a difference from the mobile communication system according to the first embodiment.

First, an IMS Registration procedure of the UE#1 in the mobile communication system according to the first modification is described with reference to FIG. 3.

As shown in FIG. 3, in Step S3001, the UE#1 sends the P-CSCF/VATF an IMS Registration request signal including the SRVCC capability indicating whether the UE#1 supports the SRVCC system.

The P-CSCF/VATF stores the SRVCC capability in Step S3002, and sends the INS Registration request signal including the SRVCC capability to the I/S-CSCF in Step S3003.

In Step S3004, the I/S-CSCF sends the INS Registration request signal including the SRVCC capability to the SCC AS. In Step S3005, the SCC AS sends an IMS Registration response signal to the I/S-CSCF.

In Step S3006, the I/S-CSCF sends the INS Registration response signal to the P-CSCF/VATF. In Step S3007, the PCSCF/VATF sends the INS Registration response signal to the UE#1.

Next, a procedure for establishing the path for voice communications between the UE#1 and the UE#2 is described with reference to FIG. 4.

Figure 4:
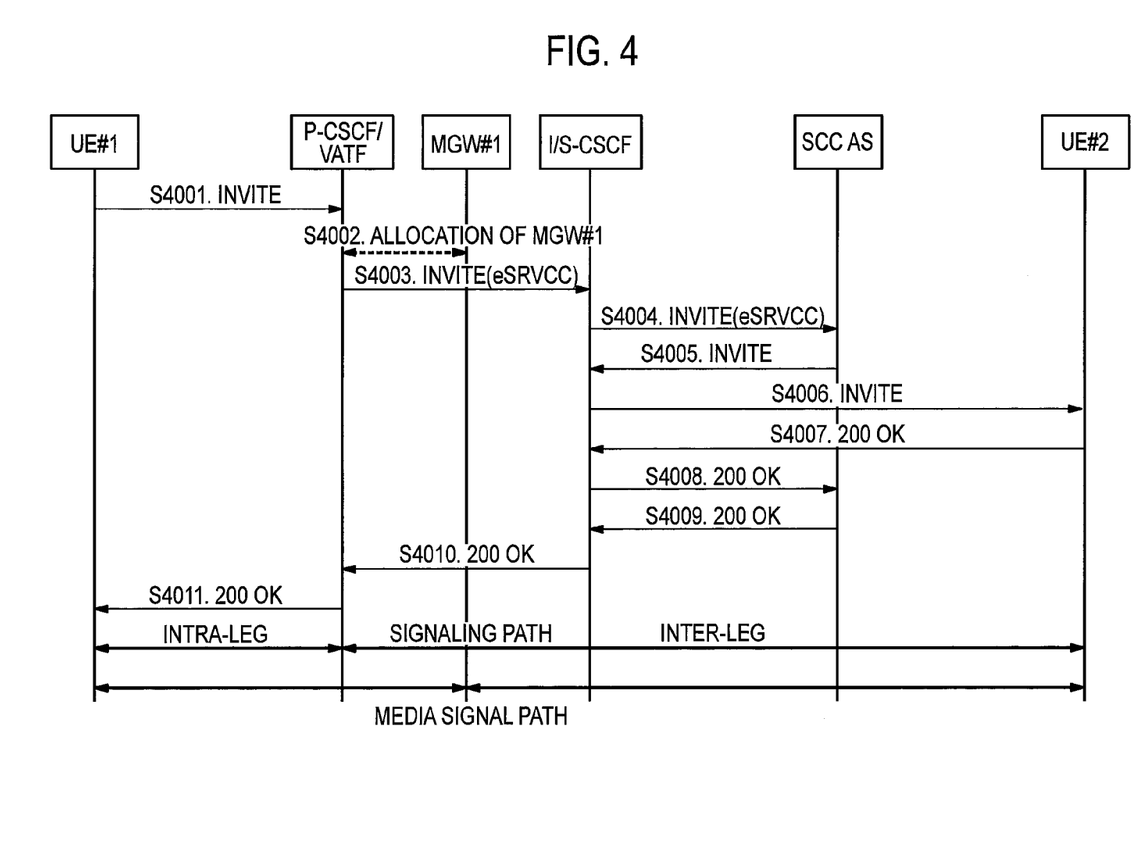
FIG. 4 is a sequence diagram for describing an operation of the mobile communication system according to the first modification of the present invention.

As shown in FIG. 4, in Step S4001, the UE#1 sends "INVITE" to the P-CSCF/VATF.

In Step S4002, the P-CSCF/VATF allocates the MGW#1 based on the SRVCC capability stored in Step S3002.

For example, the P-CSCF/VATF may be configured to allocate the MGW#1 when the SRVCC capability indicates that the UE#1 supports the SRVCC system.

In Step S4002, the P-CSCF/VATF sends "INVITE" including "eSRVCC" to the I/S-CSCF.

In Step S4003, the I/S-CSCF sends "INVITE" including "eSRVCC" to the SCC AS.

In Step S4005, the SCC AS sends "INVITE" to the I/S-CSCF.

The operations in Steps S4006 to S4011 are the same as those in Steps S1009 to S1014 shown in FIG. 2.

Second Modification

A mobile communication system according to a second modification of the first embodiment described above is described below with reference to FIG. 5 and FIG. 6, while focusing on a difference from the mobile communication system according to the first embodiment.

First, the IMS Registration procedure of the UE#1 in the mobile communication system according to the second modification is described with reference to FIG. 5.

Figure 5:
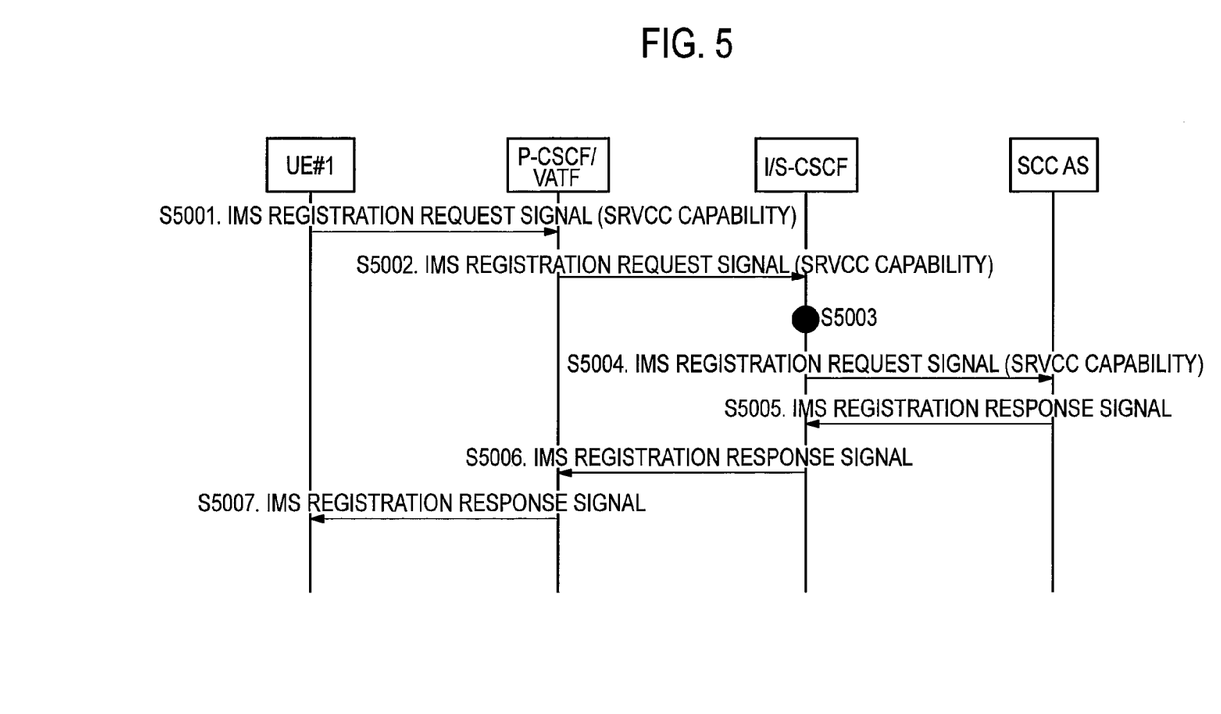
FIG. 5 is a sequence diagram for describing an operation of a mobile communication system according to a second modification of the present invention.

As shown in FIG. 5, in Step S5001, the UE#1 sends the P-CSCF/VATF the IMS Registration request signal including the SRVCC capability indicating whether the UE#1 supports the SRVCC system.

The P-CSCF/VATF sends the IMS Registration request signal including the SRVCC capability to the I/S-CSCF in Step S5002.

The I/S-CSCF stores the SRVCC capability in Step S5003, and sends the IMS Registration request signal including the SRVCC capability to the SCC AS in Step S5004. In Step S5005, the SCC AS sends the IMS Registration response signal to the I/S-CSCF. The SRVCC capability may not be notified in Step S5004.

In Step S5006, the I/S-CSCF sends the IMS Registration response signal to the P-CSCF/VATF. In Step S5007, the PCSCF/VATF sends the IMS Registration response signal to the UE#1.

Next, a procedure for establishing the path for voice communications between the UE#1 and the UE#2 is described with reference to FIG. 6.

Figure 6:
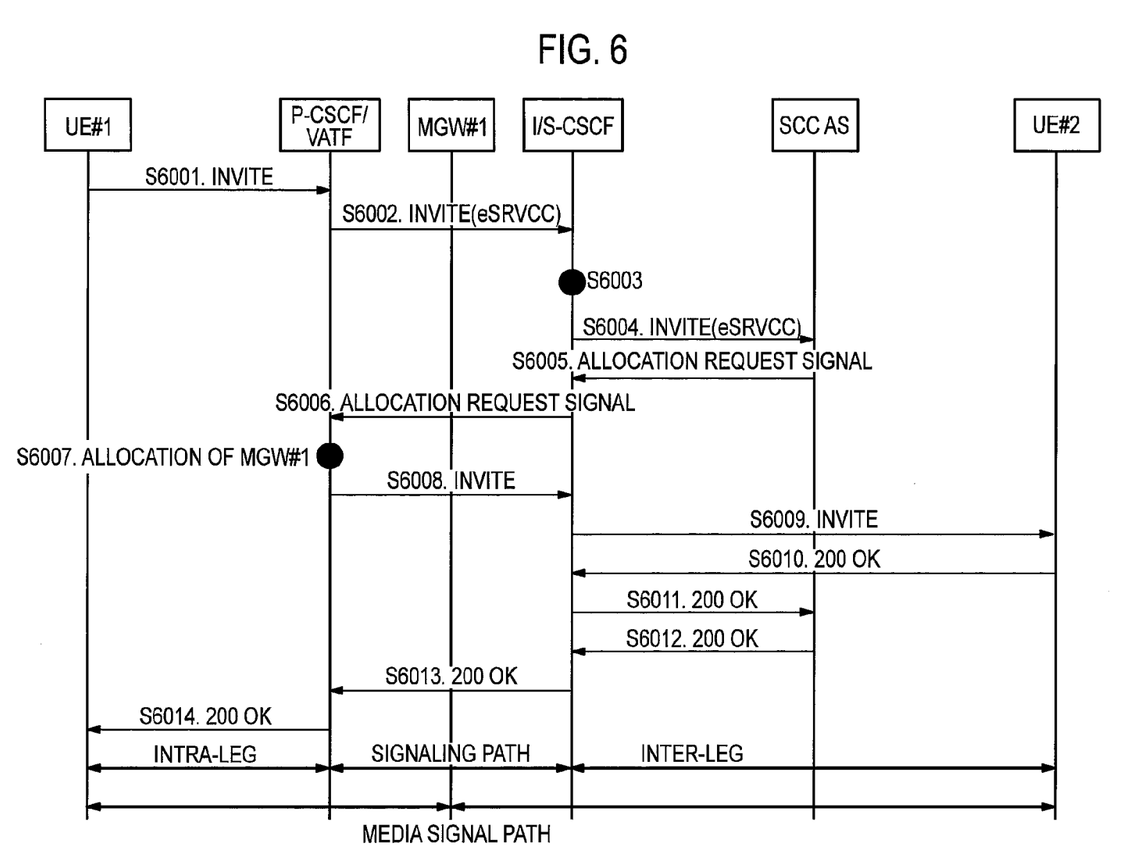
FIG. 6 is a sequence diagram for describing an operation of the mobile communication system according to the second modification of the present invention.

As shown in FIG. 6, in Step S6001, the UE#1 sends "INVITE" to the P-CSCF/VATF.

In Step S6002, the P-CSCF/VATF sends "INVITE" including "eSRVCC" to the I/S-CSCF.

In Step S6003, the I/S-CSCF determines whether to use the enhanced SRVCC system. The determination is based on a subscriber profile of the UE#1 managed by the HSS, the SRVCC capability stored in Step S3002, a policy of the home or visited network of the UE#1, and the like.

The operations in Steps S6004 to S6014 are the same as those in Steps S1004 to S1014 shown in FIG. 2.

The features of the embodiment described above may be described as follows.

A first feature of the present invention is a mobile communication method in a mobile communication system including E-UTRAN (first radio access network that does not support circuit-switched communications) and UTRAN/GERAN (second radio access network that supports the circuit-switched communications), and being capable of using enhanced SRVCC system (switching scheme) for switching a path for voice communications between the UE#1 and a UE#2 in MGW#1 (predetermined node) in a visited network of a UE#1 (first mobile station), from a path through E-UTRAN to a path through UTRAN/GERAN, the mobile communication method including the steps of: sending "INVITE (session start request signal)" including SRVCC capability (capability of the first mobile station) from the UE#1 to a P-CSCF/VATF (first session control node) in the visited network of the UE#1; sending "INVITE" including SRVCC capability from the P-CSCF/VATF to IMS (service control network); determining, by the IMS, whether to send an allocation request signal for the MGW#1 based on the SRVCC capability; and allocating, by P-CSCF/VATF, the MGW#1 based on the allocation request signal received from the IMS.

A second feature of the present invention is a mobile communication method in a mobile communication system including E-UTRAN and UTRAN/GERAN, and being capable of using enhanced SRVCC system for switching a path for voice communications between the UE#1 and a UE#2 in an MGW#1 in a visited network of a UE#1 from a path through E-UTRAN to a path through UTRAN/GERAN, the mobile communication method including the steps of: notifying by the UE#1, a P-CSCF/VATF of a SRVCC capability in an IMS Registration procedure (registration procedure to service control network); sending "INVITE" from the UE#1 to the P-CSCF/VATF; and determining by the P-CSCF/VATF, whether to allocate the MGW#1 based on the SRVCC capability.

A third feature of the present invention is a mobile communication method in a mobile communication system including E-UTRAN and UTRAN/GERAN, and being capable of using enhanced SRVCC system for switching a path for voice communications between the UE#1 and a UE#2 in an MGW#1 in a visited network of a UE#1, from a path through E-UTRAN to a path through UTRAN/GERAN, the mobile communication method including the steps of: notifying, by the UE#1, an IMS of SRVCC capability in an IMS Registration procedure; sending "INVITE" from the UE#1 to a P-CSCF/VATF; sending "INVITE" from the P-CSCF/VATF to the IMS; determining, by the IMS, whether to send an allocation request signal for the MGW#1 based on the SRVCC capability; and allocating, by the P-CSCF/VATF, the MGW#1 based on the allocation request signal received from the IMS.

A fourth feature of the present invention is a mobile communication system including E-UTRAN and UTRAN/GERAN, and being capable of using enhanced SRVCC system for switching a path for voice communications between the UE#1 and a UE#2 in an MGW#1 in a visited network of a UE#1, from a path through E-UTRAN to a path through UTRAN/GERAN. A P-CSCF/VATF is configured to send, when receiving "INVITE" including SRVCC capability from the UE#1, "INVITE" including the SRVCC capability to an IMS. The IMS is configured to determine whether to send an allocation request signal for the MGW#1 based on the SRVCC capability. The P-CSCF/VATF is configured to allocate the MGW#1 based on the allocation request node received from the IMS.

A fifth feature of the present invention is a mobile communication system including E-UTRAN and UTRAN/GERAN, and being capable of using enhanced SRVCC system for switching a path for voice communications between the UE#1 and a UE#2 in an MGW#1 in a visited network of a UE#1, from a path through E-UTRAN to a path through UTRAN/GERAN. A P-CSCF/VATF is configured to acquire and store SRVCC capability in an IMS Registration procedure of the UE#1. The P-CSCF/VATF is configured to determine whether to allocate the MGW#1 based on the SRVCC capability when receiving "INVITE" from the UE#1.

A sixth feature of the present invention is a mobile communication system including E-UTRAN and UTRAN/GERAN, and being capable of using enhanced SRVCC system for switching a path for voice communications between the UE#1 and a UE#2 in an MGW#1 in a visited network of a UE#1, from a path through E-UTRAN to a path through UTRAN/GERAN. An IMS is configured to acquire and store SRVCC capability in an IMS Registration procedure of the UE#1. The IMS is configured to determine whether to send an allocation request signal for the MGW#1 based on the stored SRVCC capability, when receiving "INVITE" sent by the UE#1. A P-CSCF/VATF is configured to allocate the MGW#1 based on the allocation request signal received from the IMS.

Note that the operations of the MSC server, the MGW#1, the MGW#2, the MME, the S-GW, the P-GW, the P-CSCF/VATF, the I/S-CSCF, the SCC AS, the SGSN, the MSC, the UE#1, the UE#2, the RNC, the NodeB, and the eNB may be implemented by hardware or may be implemented by a software module to be executed by a processor, or may be implemented in combination of the both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such recording medium is connected with a processor so that the processor can read and write information on the recording medium. Also, such recording medium may be integrated on the processor. Instead, such recording medium and the processor may be provided inside ASIC. Such ASIC may be provided inside the MSC server, the MGW#1, the MGW#2, the MME, the S-GW, the P-GW, the P-CSCF/VATF, the I/S-CSCF, the SCC AS, the SGSN, the MSC, the UE#1, the UE#2, the RNC, the NodeB, and the eNB. Alternatively such recording medium and the processor may be provided as discrete components inside the MSC server, the MGW#1, the MGW#2, the MME, the S-GW, the P-GW, the P-CSCF/VATF, the I/S-CSCF, the SCC AS, the SGSN, the MSC, the UE#1, the UE#2, the RNC, the NodeB, and the eNB.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention can provide a mobile communication method and a mobile communication system capable of preventing a resource of an MGW#1 from being wasted.

DESCRIPTION OF REFERENCE NUMERALS

UE#1, UE#2 mobile station
MME mobility management node
SGSN packet exchange
MSC circuit exchange
S-GW, P-GW . . . gateway device

The invention claimed is:

1. A mobile communication method in a mobile communication system for Single Radio Voice Call Continuity (SRVCC) including a first radio access network that does not support circuit-switched communications, a second radio access network that supports the circuit-switched communications, and a gateway within a serving network of a first mobile station for switching a path for voice communications between the first mobile station and a second mobile station, from a path through the first radio access network to a path through the second radio access network, the mobile communication method comprising:
    sending, by the first mobile station, a registration request to a control node within the serving network of the first mobile station;
    sending, by the control node, the registration request to a Service Centralization and Continuity Application Server (SCC AS);
    sending, by the SCC AS, a registration response to the control node;
    sending, by the control node, the registration response to the first mobile station;
    sending, by the first mobile station, an "INVITE" signal to the control node; and
    determining, by the control node, whether to anchor the path based on SRVCC capability of the first mobile station.

2. A mobile communication system for Single Radio Voice Call Continuity (SRVCC), the mobile communication system comprising:
    a first radio access network that does not support circuit-switched communications,
    a second radio access network that supports the circuit-switched communications, and
    a gateway within a serving network of a first mobile station for switching a path for voice communications between the first mobile station and a second mobile station, from a path through the first radio access network to a path through the second radio access network, wherein
    the first mobile station sends a registration request to a control node within the serving network of the first mobile station;
    the control node sends the registration request to a Service Centralization and Continuity Application Server (SCC AS);
    the SCC AS sends a registration response to the control node;
    the control node sends the registration response to the first mobile station;
    the first mobile station sends an "INVITE" signal to the control node; and
    the control node determines whether to anchor the path based on SRVCC capability of the first mobile station.

3. A communication method for a mobile station comprising:
    transmitting a registration request to a control node within a serving network of the mobile station;
    receiving a registration response from a Service Centralization and Continuity Application Server (SCC AS) through the control node;
    transmitting an "INVITE" signal to the control node; and
    controlling the voice communication so that the control node determines whether to anchor a path for voice communication between the mobile station and a communication partner of the mobile station in a gateway with in the serving network of the mobile station for switching the path from a path through the first radio access network to a path through the second radio access network, for Single Radio Call Continuity (SRVCC), based on SRVCC capability of the mobile station.

4. A mobile station comprising:
    a memory storing instructions; and
    at least one processor configured to process the instructions to:
        transmit a registration request to a control node within a serving network of the mobile station;
        receive a registration response from a Service Centralization and Continuity Application Server (SCC AS) through the control node;
        transmit an "INVITE" signal to the control node; and
        control the voice communication so that the control node determines whether to anchor a path for voice communication between the mobile station and a communication partner of the mobile station in a gateway with in the serving network of the mobile station for switching the path from a path through the first radio access network to a path through the second radio access network, for Single Radio Call Continuity (SRVCC), based on SRVCC capability of the mobile station.

5. A mobile communication method in a mobile communication system for Single Radio Voice Call Continuity (SRVCC) including a first radio access network that does not support circuit-switched communications, a second radio access network that supports the circuit-switched communications, and a gateway within a serving network of a first mobile station for switching a path for voice communications between the first mobile station and a second mobile station, from a path through the first radio access network, to a path through the second radio access network, the mobile communication method comprising the steps of:
    sending, by the first mobile station, a registration request to a control node within the serving network of the first mobile station;
    sending, by the control node, the registration request to a Service Centralization and Continuity Application Server (SCC AS);
    sending, by the SCC AS, a registration response to the control node;
    sending, by the control node, the registration response to the first mobile station;
    sending, by the first mobile station, an "INVITE" signal to the control node; and determining, by the control node, whether to allocate a resource of the gateway based on SRVCC capability of the first mobile station.

6. A communication method for a mobile station in a mobile communication system for Single Radio Voice Call Continuity (SRVCC) including a first radio access network that does not support circuit-switched communications, a second radio access network that supports the circuit-switched communications, and a gateway within a serving network of the mobile station for switching a path for voice communications between the mobile station and a communication partner of the mobile station, from a path through the first radio access network, to a path through the second radio access network, the communication method comprising:

transmitting, by the first mobile station, a registration request to a control node within the serving network of the first mobile station;

transmitting, by the control node, the registration request to a Service Centralization and Continuity Application Server (SCC AS);

transmitting, by the SCC AS, a registration response to the control node;

transmitting, by the control node, the registration response to the first mobile station;

transmitting an "INVITE" signal to the control node; and     controlling the voice communication so that the control node determines whether to allocate a resource of the gateway based on SRVCC capability of the mobile station.

7. A mobile communication method for a mobile station comprising:

transmitting a registration request to a control node within a serving network of the mobile station;

receiving a registration response from a Service Centralization and Continuity Application Server (SCC AS) through the control node;

transmitting an "INVITE" signal to the control node; and     controlling the voice communication so that the control node determines whether to allocate a resource of a gateway with in the serving network of the mobile station for switching a path for voice communication between the mobile station and a communication partner of the mobile station, from a path through the first radio access network to a path through the second radio access network, for Single Radio Call Continuity (SRVCC), based on SRVCC capability of the mobile station.

8. A mobile station comprising:

a memory storing instructions; and at least one processor configured to process the instructions to:

transmit a registration request to a control node within a serving network of the mobile station;

receive a registration response from a Service Centralization and Continuity Application Server (SCC AS) through the control node;

transmit an "INVITE" signal to the control node; and control the voice communication so that the control node determines whether to allocate a resource of a gateway with in the serving network of the mobile station for switching a path for voice communication between the mobile station and a communication partner of the mobile station, from a path through the first radio access network to a path through the second radio access network, for Single Radio Call Continuity (SRVCC), based on SRVCC capability of the mobile station.

\* \* \* \* \*